April 5, 1955 — R. H. CHAFFEY — 2,705,546

SILENCERS AND AIR INTAKE FILTER SILENCERS

Filed May 22, 1950

Inventor
Reginald H. Chaffey
By [signature]
Atty.

United States Patent Office 2,705,546
Patented Apr. 5, 1955

2,705,546

SILENCERS AND AIR INTAKE FILTER SILENCERS

Reginald Herbert Chaffey, Guildford, England, assignor to Vokes Limited, Guildford, England Application May 22, 1950, Serial No. 163,363

Claims priority, application Great Britain June 3, 1949

2 Claims. (Cl. 183—73)

This invention relates to that type of silencer which comprises in effect a reservoir that is fed by an intake tube and which may be used to silence the intake pulsations of internal combustion engines, piston or rotary compressors and the like.

As the available space is usually very restricted on such engines, it is the purpose of the present invention to construct this type of silencer in a compact form.

It is also known that the usefulness of such a silencer is limited owing to resonances which occur at certain frequency bands, both in the inlet tube and reservoir.

In the silencer about to be described the most objectionable of these are eliminated by the provision of apertures at critical positions which serve to equalise the difference in internal pressure, between the intake tube and the reservoir, which occurs at resonant frequencies.

The provision of such apertures is simplified by forming the intake tube as an annular passage formed within one end of a cylindrical casing the greater part of which constitutes the reservoir. The apertures can then directly connect the tube to the reservoir at the critical points.

The parts of the invention for which patent protection is desired are those embodied in the preferred form and set out in the claims.

Figure 2:
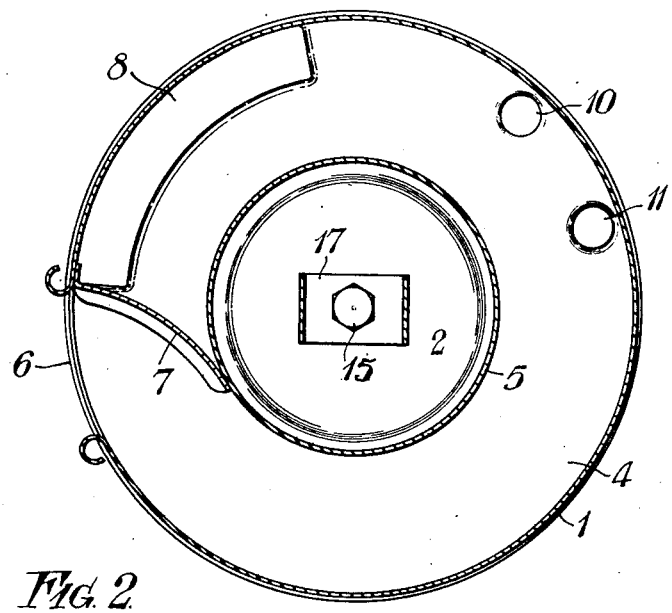
Figure 1:
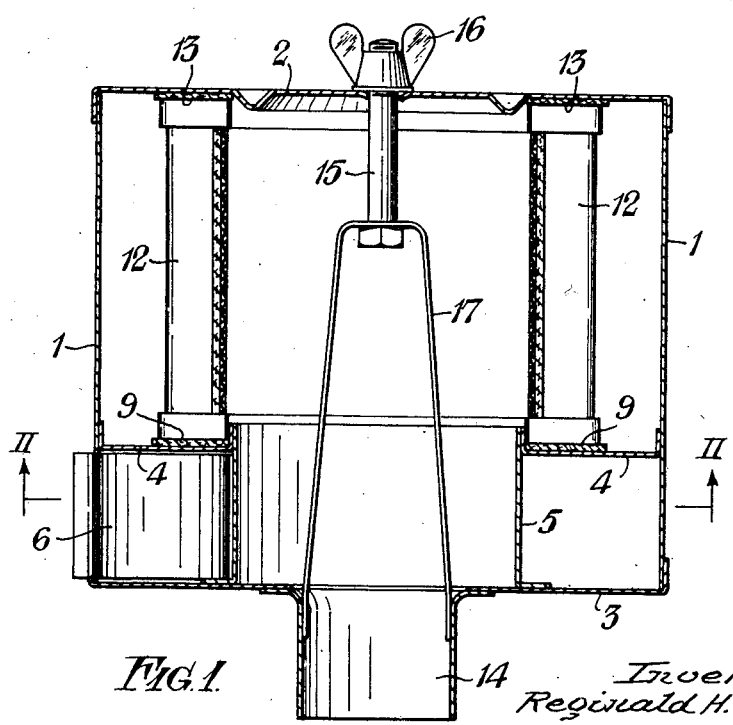

The preferred form is shown by the accompanying drawings in which:

Fig. 1 is a central vertical section and
Fig. 2 is a section on the line II, II, of Fig. 1.

The outer casing is constructed in the form of a cylinder 1 closed at both ends by end caps 2 and 3 and its main volume constitutes the reservoir of the silencer.

The intake tube comprises an annular channel which is formed by an internal sub-division of the cylinder. It is roughly square in cross-section, the lower and outer walls being formed by the end cap 3 and side of the cylinder 1, the upper internal wall by a flat ring-shaped baffle 4 and the fourth, or inner wall, by a cylinder 5 of smaller diameter and shorter length than the outer case. The entry is an aperture 6 of approximately the same cross-sectional area as that of the tube, which is situated in the side of the outer case. A blanking plate or partition 7 is disposed at a suitable angle or curve across the intake tube opposite the inlet. This serves to separate the inlet and outlet ends of the tube. The outlet is situated behind the blanking plate and consists of an aperture 8 of suitable area in the upper wall of the tube. The aperture 8 may conveniently lie close to the outer cylinder 1, occupying less than half the radial dimension of the ring-shaped baffle 4, and extending over a considerable angle, possibly 60° to 90°, to make its area substantially the same as that of the tube. The inner portion of the baffle 4 is there left intact to receive the end seal 9 of a cylindrical filter element. This aperture 8 is also the entry to the main reservoir.

At a point approximately two-thirds the distance along the axial length of the intake tube taken circumferentially of the cylinder from the entry 6 to the outlet 8— one or more apertures 10, 11 are made in the baffle 4, to permit the equalisation of internal pressure between the two members—as already described. These apertures 10, 11 may also conveniently be positioned near the outer cylinder 1 clear of the end seal 9 of a filter element, and their area may be relatively quite small.

This position is subject to alteration according to any variation in the physical dimensions of the silencer, and to suit the characteristics of the engine or compressors to which it is fitted.

A pleated or other appropriate filter element 12 of cylindrical form and preferably of sound absorbing material may be placed inside the reservoir chamber, and sealed by felt rings or the like 9, 13 which are secured respectively to the baffle 4 forming the upper wall of the intake tube and at the other to the inside of the upper end cap 2 of the silencer.

An annular space is left between the outside of the element 12 and the case 1 to permit the outlet 8 from the intake tube and the pressure equalising aperture or apertures 10, 11 to remain unobstructed and to allow the air to be filtered to circulate freely round outside of the element.

The outlet 14 from the silencer may be disposed at or near the centre of the lower end cap 3 in any position which permits access to the filtered air from the inside of the element.

The top cap 2 may be secured by means of a central bolt 15 and wing nuts 16. This permits its removal in order to change the element. The central bolt is secured to the opposite end cap by means of a suitable bridge-piece 17.

In another form of construction this device may be used without the filter, to silence exhaust air or gases.

I claim:

1. A silencer comprising an outer casing in the form of an outer cylinder closed at both ends in combination with an inner cylinder and a ring-shaped baffle defining an annular passage roughly square in cross-section, a partition acros the annular passage, the outer casing having an inlet aperture open into the annular passage adjacent to one side of the partition and of approximately the same area as the cross-sectional area of the annular passage, the baffle having an outlet aperture adjacent to the other side of the partition, the said aperture extending across not more than about half the radial dimension of the annular passage and along a considerable angle so that its area is approximately the same as the cross-sectional area of the annular passage, the baffle also having at least one relatively small pressure equalising aperture at a selected position between said inlet aperture and said outlet aperture.

2. A silencer as in claim 1 wherein a filter of cylindrical form is positioned in the cylinder in the path of gases flowing from the annular passage into the machine to be silenced.

References Cited in the file of this patent

UNITED STATES PATENTS

| | | |
|---|---|---|
| 1,854,010 | Woodford | Apr. 12, 1932 |
| 2,050,581 | Orem | Aug. 11, 1936 |
| 2,138,510 | Rauen | Nov. 29, 1938 |
| 2,510,440 | Vokes | June 6, 1950 |
| 2,511,713 | Hoyle et al. | June 13, 1950 |
| 2,517,623 | Baird | Aug. 8, 1950 |
| 2,526,627 | Beckett | Oct. 24, 1950 |

FOREIGN PATENTS

| | | |
|---|---|---|
| 184,600 | Germany | May 2, 1907 |
| 65,481 | Denmark | Aug. 4, 1947 |